(12) United States Patent
Wong et al.

(10) Patent No.: US 7,836,387 B1
(45) Date of Patent: Nov. 16, 2010

(54) SYSTEM AND METHOD FOR PROTECTING DATA ACROSS PROTECTION DOMAIN BOUNDARIES

(75) Inventors: Brian L. Wong, Midlothian, VA (US);
David Robinson, Austin, TX (US);
Spencer Shepler, Austin, TX (US);
Richard J. McDougall, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 710 days.

(21) Appl. No.: 11/118,885

(22) Filed: Apr. 29, 2005

(51) Int. Cl.
*G06F 7/02* (2006.01)
(52) U.S. Cl. .................... 714/819; 714/E11.04
(58) Field of Classification Search .......... 714/819, 714/E11.04
See application file for complete search history.

(56) References Cited

U.S. PATENT DOCUMENTS

| | | | | |
|---|---|---|---|---|
| 5,559,814 A | * | 9/1996 | Rolin et al. ............... | 714/819 |
| 5,752,251 A | * | 5/1998 | Cripps .................... | 707/202 |
| 5,826,032 A | * | 10/1998 | Finn et al. ................ | 709/236 |
| 6,163,859 A | * | 12/2000 | Lee et al. ................. | 714/38 |
| 6,279,140 B1 | * | 8/2001 | Slane ..................... | 714/807 |
| 6,865,157 B1 | * | 3/2005 | Scott et al. ............... | 370/242 |
| 7,054,960 B1 | * | 5/2006 | Bezbaruah et al. ......... | 710/33 |
| 2003/0188231 A1 | * | 10/2003 | Cronce ................... | 714/52 |
| 2004/0216150 A1 | * | 10/2004 | Scheifler et al. .......... | 719/330 |

OTHER PUBLICATIONS

U.S. Appl. No. 10/723,204, Talagala et al.

* cited by examiner

*Primary Examiner* — Scott T Baderman
*Assistant Examiner* — Enam Ahmed
(74) *Attorney, Agent, or Firm* — Park, Vaughan, Fleming & Dowler LLP

(57) ABSTRACT

A system and method for ensuring or verifying the integrity of data transmitted between protection domains. When the data is transmitted, it may be received in a different logical configuration (e.g., as a different number of "chunks"). The receiving domain computes its data integrity metadata (e.g., checksum, CRC, parity) on its form of the data using its protection scheme (e.g., checksum algorithm), and also applies the sending domain's protection scheme to the data as it was received from the sending domain. Similarly, the sending domain applies the receiving domain's protection scheme to compute data integrity metadata on the transmitted data as it appears in the receiving domain. The metadata may be compared to determine whether the data was corrupted during the transfer. Either domain may forward its data integrity metadata to the other, which may store and/or forward it as needed.

24 Claims, 4 Drawing Sheets

SYSTEM AND METHOD FOR PROTECTING DATA ACROSS PROTECTION DOMAIN BOUNDARIES

BACKGROUND

This invention relates to the field of computers. More particularly, a system and methods are provided for ensuring the validity of data transmitted between protection domains in which different data integrity protection schemes are applied.

A protection domain is a set of physical and/or logical objects for processing or communicating data. A protection domain may therefore comprise physical components of a computing device or network, such as a disk drive, a communication interface, a communication link, etc. Also, a protection domain may comprise logical components of a computing device or network, such as an operating system, a set of program objects, a protocol, etc.

Protection domains may have a variety of scopes or sizes, and so a large system or network may include any number of protection domains covering different subsystems or sub-networks. Different protection domains may employ different ECC (Error Checking and Correction) schemes for protecting data, such as different checksum types or algorithms, different parity computations, etc.

Existing schemes for protecting the integrity of data within protection domains generally deal with protection domains that completely overlap or that are completely separate. An example of the former can be seen in how an NFS (Network File System) application may apply an ECC scheme (e.g., application-level checksums) to data delivered via TCP (Transport Control Protocol), which is already protected by transport-level checksums. The NFS domain completely overlaps the TCP domain.

An example of non-overlapping protection domains may be seen in the relationship between TCP data being delivered across a communication link and a disk drive on which the data will be stored. The TCP and disk domains are completely separate.

However, existing data integrity protection schemes do not address environments in which one protection domain, such as NFS, partially overlaps another domain, such as a disk drive on which NFS data is stored. These schemes therefore cannot ensure that data is not corrupted as it transitions between one protection domain and another, partially overlapping domain.

As a result, there is often no guarantee that data written to a disk drive (or other storage device) or network (or other communication) link will match what is later read from the disk drive or received at another point on the network link. And, as storage densities increase and storage devices and communication links carry greater and greater amounts of data, the likelihood of some portion of the data being corrupted increases commensurately.

Thus, there is a need for a system and a method for ensuring the integrity of data as it is passed between partially overlapping protection domains.

SUMMARY

In one embodiment of the invention, a system and methods are provided for ensuring or verifying the integrity of data transmitted between overlapping or partially overlapping protection domains. When the data is transmitted, it may be reformed or received in a different logical configuration. For example, a first set of chunks sent from a sending domain may be received as a second set of chunks that are of different sizes.

The receiving domain computes its data integrity metadata (e.g., checksum, CRC, parity) on its form of the data (e.g., the second set of chunks) using its protection scheme (e.g., checksum algorithm). The receiving protection domain also applies the sending domain's protection scheme to the data in the form the data was transmitted from the sending domain (e.g., the first set of chunks).

Similarly, the sending domain applies the receiving domain's protection scheme to compute data integrity metadata on the transmitted data as it appears in the receiving domain (e.g., the second set of chunks). The metadata may be compared to determine whether the data was corrupted during the transfer. Either domain may forward its data integrity metadata to the other, which may store and/or forward it as needed.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for protecting the integrity of data transmitted between adjacent or overlapping protection domains. In this embodiment, a protection domain is a physical or logical area in which data is processed, stored or conveyed. A single domain may be large enough to comprise multiple computing devices (e.g., a network, a subnetwork, a cluster), or as small as a single storage device (e.g., disk drive) or communication medium (e.g., network link). In term of logical structures, a protection domain may comprise an operating system (or portion of an operating system), an application, a communication protocol, etc.

Each protection domain employs a method or mechanism for protecting data and ensuring its correctness within that domain. Thus, each domain applies some type of data integrity function and associated metadata, where the metadata may comprise a checksum, parity, generation identifiers, data name, etc. U.S. patent application Ser. No. 10/723,204, entitled "Maintaining High Data Integrity" and filed Nov. 25, 2003, describes various types of data integrity metadata, and is hereby incorporated by reference into the present application.

Any domain's protection scheme may differ from any other domain's scheme. Therefore, when data is passed from one protection domain to an adjacent or overlapping domain, or through a sequence of domains, its integrity is likely to be protected differently in each.

Figure 1:
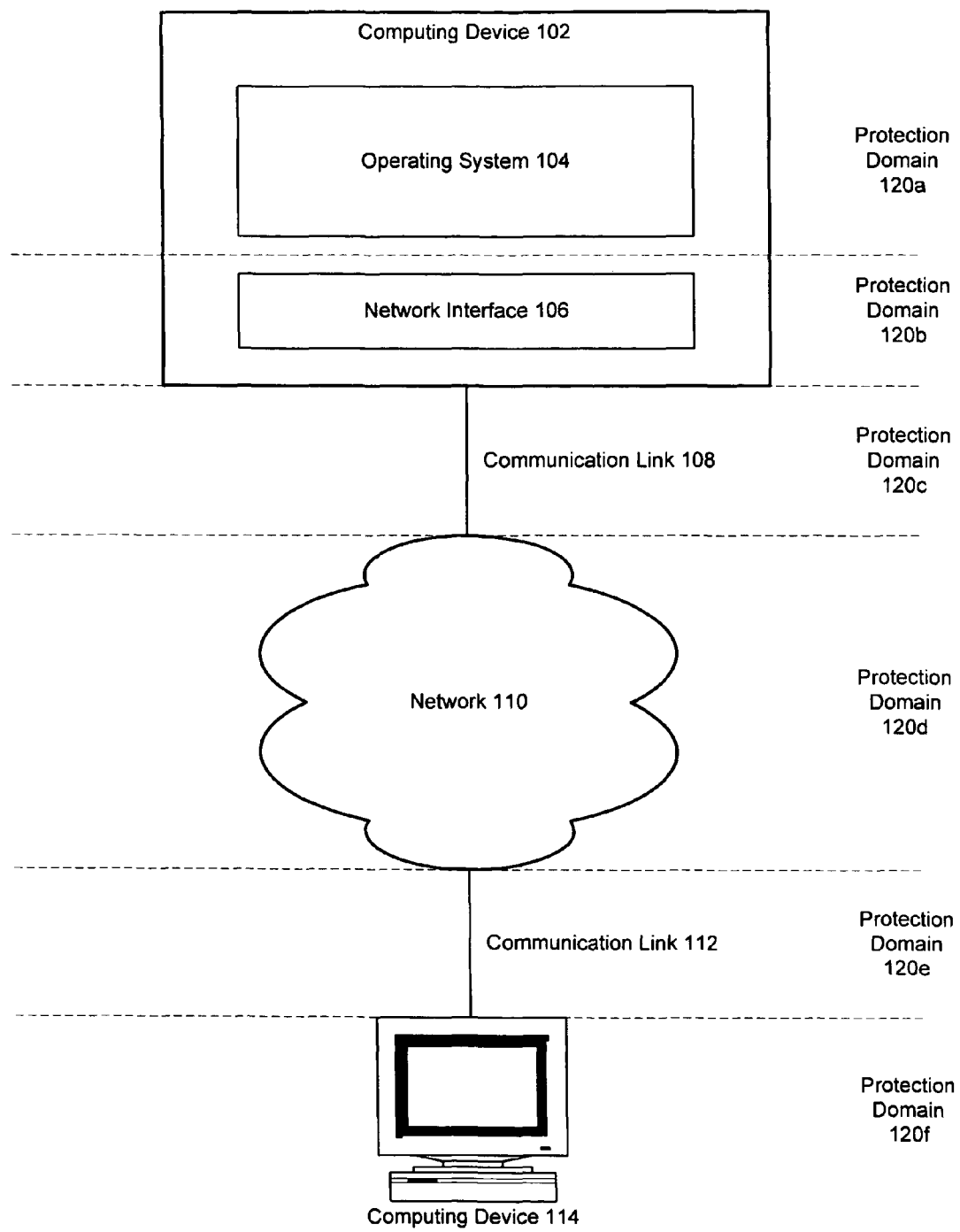
FIG. 1 is a block diagram depicting protections domains, according to one embodiment of the invention.

FIG. 1 depicts one possible arrangement of protection domains in a network or other collection of computing devices. In this environment, computing device 102 is coupled to network 110 by communication link 108, and computing device 114 is coupled to the network by communication link 112.

Computing device 102 contains protection domain 120a (comprising operating system 104) and protection domain 120b (comprising network interface 106). Thus, operating system 104 may apply one type of data integrity metadata (e.g., checksums performed on chunks of data equal in size to a memory page), while network interface 106 or a corresponding communication protocol applies a different type (e.g., the CRC or cyclic redundancy check on chunks of data corresponding to packets, frames, cells or other units).

Similarly, each of communication link 108, network 110, communication link 112 and computing device 114 lies within a separate protection domain, and may use virtually any type of data integrity metadata. Each time data being communicated between computing device 102 (e.g., a client) and computing device 114 (e.g., a server) enters a different protection domain, that domain's protection scheme is applied to protect the data while it resides in that domain.

Thus, new checksums, generation identifiers, or other data integrity metadata may be generated. Traditionally, such metadata is discarded when the data is transferred to the next domain. In embodiments of the invention described herein, this metadata may be communicated among domains and stored in any of them.

Any or all protection domains in FIG. 1 may be considered to partially overlap their neighbors. Overlapping in this context means that more than one type of data integrity metadata is computed on a single set of data, and thus multiple data protection schemes cover the data at some point in time.

For example, network interface 106 of computing device 102 temporarily stores data from or for operating system 104, in a form recognizable to the operating system, and so these two components' protection domains (domains 120b, 120a) may be considered to overlap. Similarly, protection domains 102b and 102c overlap because as a stream of data is placed onto the link or received from the link, it is part of both domains.

In comparison, when protection domains are merely adjacent (but not overlapping), a set of data is protected first by one domain, then is not protected in either domain, then is covered by the adjacent domain. For example, when data is written across a network to a storage array, the data may be protected by a communication protocol until received by the storage array, but may not be protected again until actually written to a device (or devices) within the array.

Figure 2:
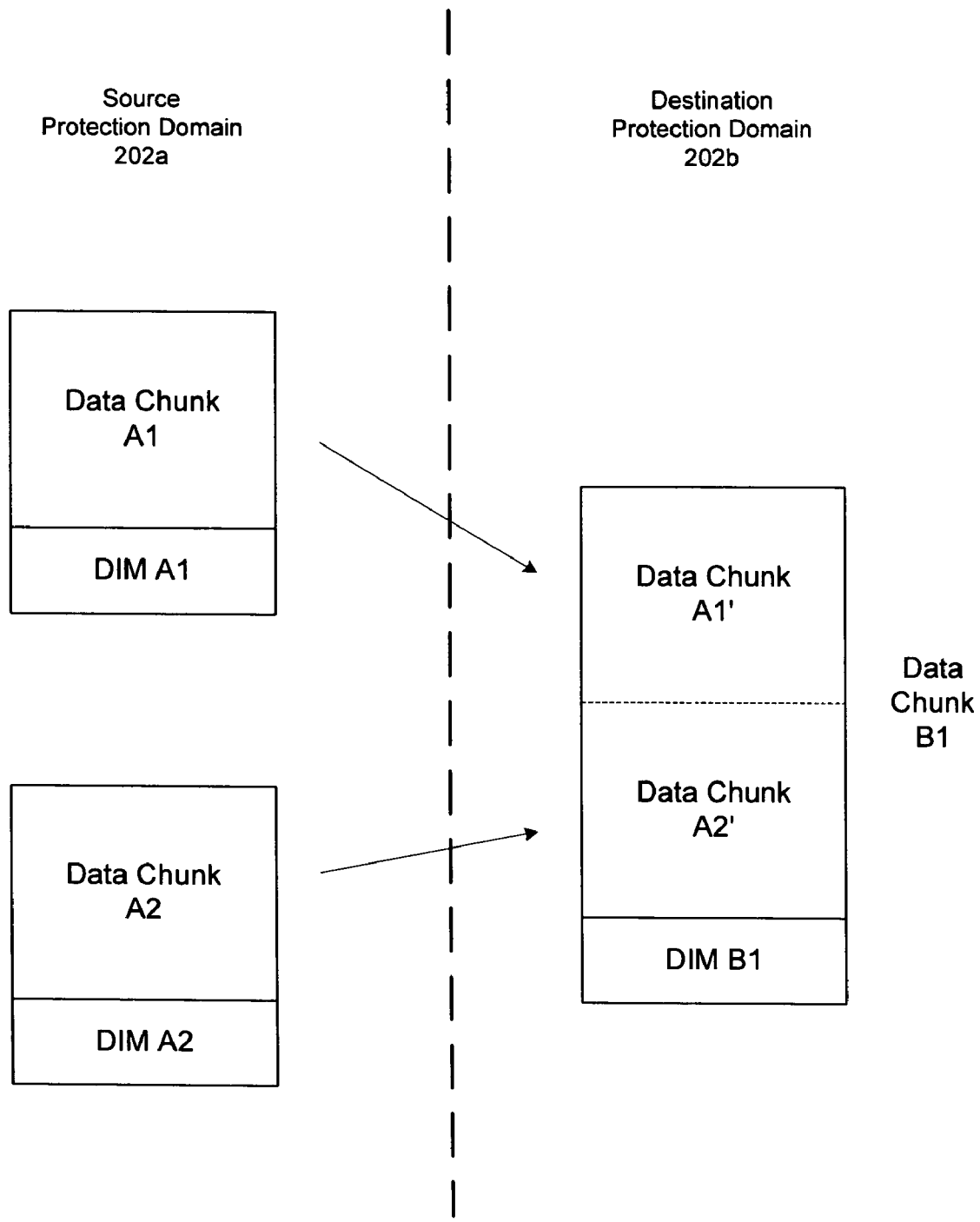
FIG. 2 is a block diagram depicting the transfer of data across a boundary between protection domains, according to one embodiment of the invention.
Figure 3:
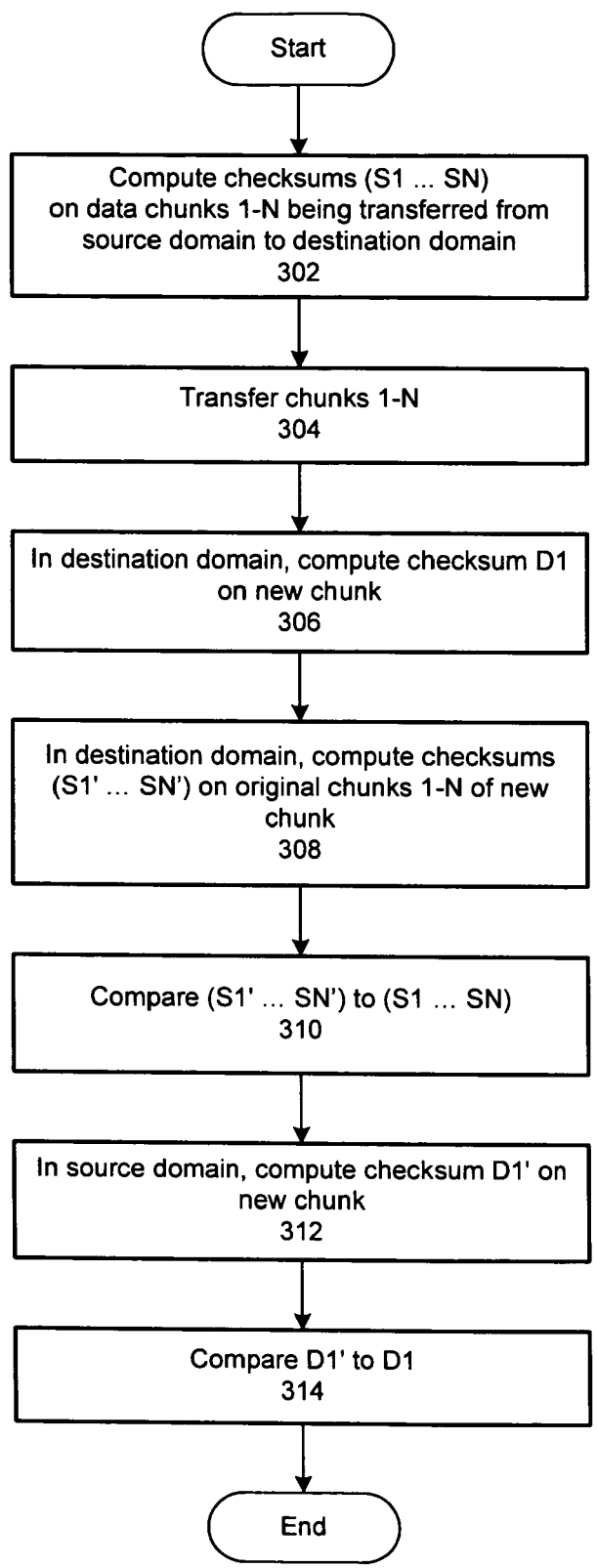
FIG. 3 is a flowchart illustrating one method of protecting data across protection domain boundaries, according to one embodiment of the invention.

In an embodiment of the invention described in conjunction with FIGS. 2 and 3, the validity or correctness of data is ensured across a boundary between adjacent or overlapping protection domains. In this embodiment of the invention, when data transits a boundary between a source domain and a destination domain, the source domain's protection scheme is applied to the data by the destination domain, and then compared to the source domain's result, and vice versa.

To illustrate, in FIG. 2 multiple "chunks" of data (chunks A1, A2) are to be transferred across a boundary between source protection domain 202a and destination protection domain 202b, to become data chunk B1. The data chunk sizes in domains 202a, 202b are arbitrary, but in this case the chunk size in domain 202b is greater than the chunk size in domain 202a. Chunks A1' and A2' in domain 202b represent data chunks A1 and A2 from domain 202a.

A domain's chunk size may depend on the nature of the domain. For example, a domain encompassing a region of memory or software that manipulates memory may operate with data chunk sizes that match memory page sizes. A domain encompassing a storage device (e.g., disk drive, compact disc) may employ data chunk sizes based on the size of storage blocks of the device. A domain encompassing a communication link or a communication protocol may use chunk sizes based on the size of packets, frames, cells or other constructs. Yet other domains may be marked by chunk sizes based on other criteria. The chunk sizes may be fixed or variably sized.

In protection domain 202a, one type of data protection is applied, such as checksums on collections of data matching the sizes of data chunks A1 and A2. DIM (Data Integrity Metadata) A1 therefore comprises the data integrity metadata (e.g., checksum) corresponding to data chunk A1, and can be used to ensure the correctness of data chunk A1 within domain 202a. Similarly DIM A2 comprises the data integrity metadata for data chunk A2.

In protection domain 202b, a different type of data protection is applied, such as checksums on collections of data the size of chunk B1, or a different checksum type or algorithm. DIM B1 comprises the metadata generated in domain 202b for data chunk B1.

Referring now to FIG. 3, a method of protecting the contents of data chunks A1 and A2 as they are transferred from source protection domain 202a to destination domain 202b is described, according to one embodiment of the invention. The source and destination protection domains are adjacent and may partially or fully overlap. This method may therefore be used for verifying the correctness of data transferred through multiple domains (e.g., for end-to-end data verification).

In this embodiment, the data integrity metadata (DIM) applied in each protection domain comprises a checksum. However, the checksums differ in the amount of data on which they are computed, the algorithm used to compute them, or some other factor.

In the illustrated embodiment, data chunks being transferred are numbered from 1 to N (the number of chunks being transferred). The checksums calculated using the algorithm and parameters of the data integrity metadata of source protection domain 202a are labeled Sx, wherein x is the ordinal number of the chunk. Similarly, checksums calculated using the algorithm and parameters of the data integrity metadata of destination protection domain 202b are labeled Dx.

In operation 302, at some time before data chunks 1-N (i.e. chunks A1 and A2 in FIG. 2) are transferred from protection domain 202a to domain 202b, their data integrity metadata are calculated. Checksums S1 ... SN (DIM A1 and DIM A2) may be stored in protection domain 202a with their data chunks, as shown in FIG. 3, or may be stored separate from the chunks.

In operation 304, chunks 1-N (A1 and A2) are transferred from domain 202a to domain 202b. This may entail writing the data to (or reading it from) memory or a storage device, signaling the data onto (or receiving it from) a wired or wireless carrier, or some other manner of communicating data within or without a computing device. The transfer involves combining chunks 1-N (A1 and A2) into a single chunk (B1) in the destination domain.

In operation 306, in destination protection domain 202b, checksum D1 (DIM B1) is calculated on the data chunk (B1), using the algorithm and parameters normally applied within domain 202b. This data integrity metadata may be stored with the chunk (B1) or separately.

In operation 308, within destination protection domain 202b, for each portion of data chunk B1 corresponding to the original chunks 1-N, checksums S1' . . . SN' (DIM A1' and DIM A2') are calculated using the algorithm and parameters of the protection scheme of domain 202a.

In operation 310, checksums S1' . . . SN' (DIM A1' and DIM A2') are compared to the data integrity metadata computed for the chunks in source protection domain 202a (i.e., checksums S1 . . . SN (DIM A1 and DIM A2)). To enable this comparison, either domain may pass its calculations to the other.

Thus, in different embodiments of the invention, the source domain's DIM for the original data chunks may be transferred to the destination domain with the chunks or separately, thereby allowing the destination domain to perform the comparison. Or, the destination domain's DIM for the original chunks may be sent to the source domain, in which case the source domain may perform the comparison.

In operation 312, within source protection domain 202a, checksum D1' is computed on the contents of the new chunk (B1), using the algorithm and parameters of protection scheme 202b.

In operation 314, checksums D1 and D1' (i.e., DIM B1 and DIM B1') are compared. Either or both domains 202a and 202b may transfer their computations to the other.

Again, in different embodiments of the invention, the destination domain's DIM for chunk B1 may be sent to the source domain, possibly with an algorithm or description for identifying the new chunk. In this case, the source domain may perform the comparison. Or, the source domain's DIM for the new chunk may be transferred to the destination domain, thereby allowing the destination domain to perform the comparison.

In the illustrated embodiment of the invention, if the comparisons in either of operations 310 and 314 fail, the transfer may be aborted. The transfer may be restarted, one or more checksums may be re-computed, or other corrective action may be taken.

In another embodiment of the invention, when one protection domain forwards data integrity metadata to another domain, it may also identify (or forward) the algorithm used to generate the metadata, and may identify how the forwarding domain forms or divides data. This may facilitate the receiving domain's application of the algorithm to verify the forwarding domain's metadata.

In embodiments of the invention, each protection domain includes a data integrity module (e.g., a set of executable code) for computing data integrity metadata. The metadata may comprise virtually any information for checking or correcting a data error (e.g., CRC, checksum, parity, generation or version identifiers), and therefore the data integrity modules of different domains may vary accordingly.

A protection domain may also include a comparison module for comparing data integrity metadata received from one protection domain with metadata generated by its own data integrity module or received from a second protection domain. Either of the data integrity module and comparison module may comprise the other.

Protection domains may also contain other modules for sending and/or receiving data, sending or receiving data integrity metadata, reformatting data (e.g., into differently sized chunks), and so on, or a data integrity or comparison module may be configured to perform any or all of these tasks.

In one alternative embodiment of the invention, a protection domain sends its data integrity metadata for a set of data when that data is transmitted to another domain. The other domain may store the metadata to facilitate the comparisons described above. In addition, the domain that receives and stores another domain's metadata may forward that metadata when the data is transmitted to another protection domain (or back to the first domain).

For example, an illustrative computing environment may include a first protection domain comprising a first computing device (e.g., a client, a server) or a physical or logical component of a first computing device. A second protection domain may comprise a second computing device or another component of the first device. If data is written from the first domain and stored in the second domain, the first domain's data integrity metadata may be stored with the data. Then, when the data is later read by the first domain, it can re-compute data integrity metadata and compare it to the previous version.

Another alternative embodiment of the invention may be applied when the source and destination protection domains employ checksums (or other data integrity protection schemes) of equal strength. Because they are of equal strength, if an error occurs while transferring data between the domains, the checksums originally computed in the source domain (e.g., DIM A1 and DIM A2 in FIG. 2) will be inconsistent with the corresponding checksums applied in the destination domain (DIM A1' and DIM A2'). As a result, the checksum computed on the reformatted data in the destination domain (DIM B1) will necessarily be inconsistent with the corresponding checksum that will be computed in the source domain (DIM B1').

Conversely, if the checksums originally computed in the source domain (DIM A1 and DIM A2) match the corresponding checksums applied in the destination domain (DIM A1' and DIM A2'), then the checksum computed on the reformatted data in the destination domain (DIM B1) must match the corresponding checksum computed in the source domain (DIM B1').

Figure 4:
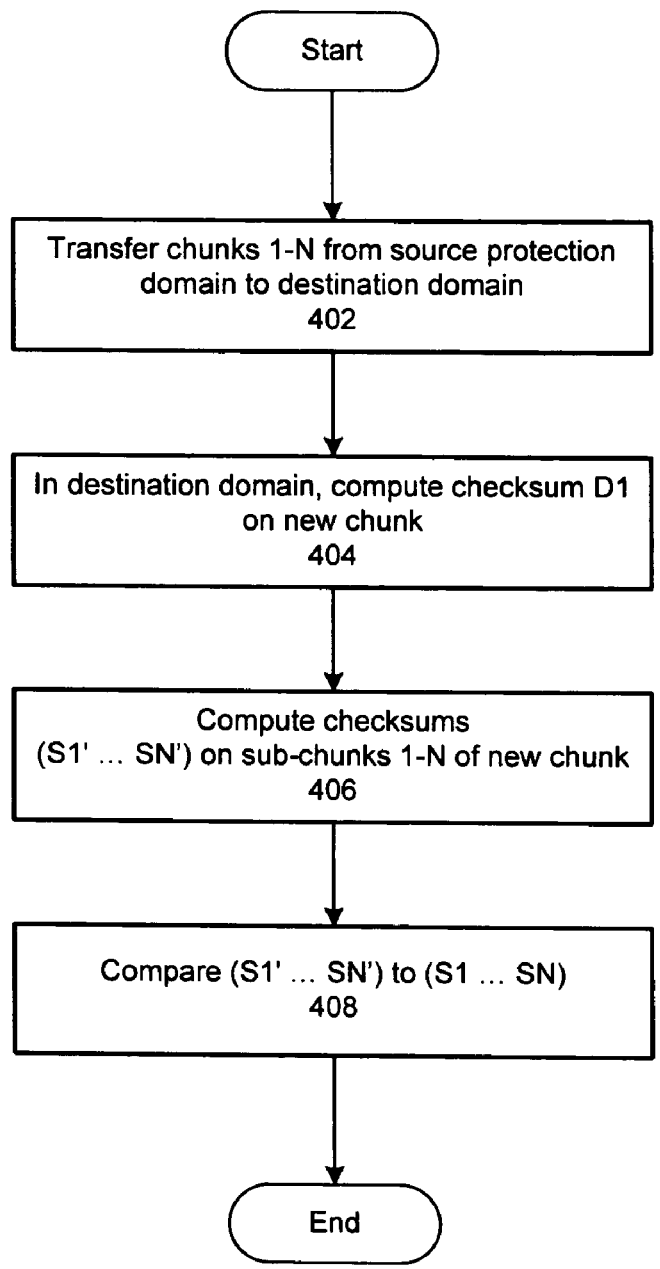
FIG. 4 is a flowchart illustrating a method of protecting data across protection domain boundaries, according to an alternative embodiment of the invention.

Therefore, in this alternative embodiment of the invention, the procedure of FIG. 3 may be reduced to the procedure depicted in FIG. 4. In state 402 of FIG. 4, data chunks 1-N are transferred from a source domain to a destination domain, where they are received as a single chunk. Illustratively, the data integrity metadata (i.e., checksums S1-SN) computed in the source domain are transmitted with, or as part of, the data chunks.

In state 404, new checksum D1 is computed on the single chunk in the destination domain. In state 406, checksums S1' . . . SN' are computed on the contents of the original chunks 1-N, using the algorithm of the source protection domain.

In state 408, checksums S1' . . . SN' are compared to checksums S1 . . . SN received from the source domain. If the comparisons fail, error recovery is initiated. This may result in aborting or restarting the data transfer, or re-computation of any of the checksums.

For data integrity metadata and techniques other than checksums, a method of the invention may be derived from the preceding descriptions.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of facilitating verification of the integrity of data transmitted between protection domains, wherein the computer includes a processor, the method comprising:
   in a source protection domain, obtaining first source checksums calculated on chunks in a source set of data chunks using an algorithm and parameters of a protection scheme for the source protection domain;
   transmitting the source set of data chunks from the source protection domain to a destination protection domain;
   transmitting the algorithm and parameters of the protection scheme for the source protection domain from the source protection domain to the destination protection domain, wherein transmitting the algorithm and parameters involves forwarding the algorithm and parameters from the source protection domain to the destination protection domain so that the destination protection domain can verify the source protection domain's checksum;
   in the destination protection domain:
      receiving the source set of data chunks as a destination set of data chunks;
      receiving the algorithm and parameters of the protection scheme for the source protection domain;
      calculating first destination checksums on the destination set of data chunks, using an algorithm and parameters of a protection scheme for the destination protection domain;
      identifying, in the destination set of data chunks, the source set of data chunks; and
      calculating second source checksums on the source set of data chunks, using algorithm and parameters of the protection scheme for the source protection domain.

2. The method of claim 1, further comprising:
   comparing the first source checksums with the second source checksums.

3. The method of claim 1, further comprising:
   transmitting the algorithm and parameters of the protection scheme for the destination protection domain to the source protection domain; and
   in the source protection domain:
      identifying, in the source set of data chunks, the destination set of data chunks;
      receiving the algorithm and parameters of the protection scheme for the destination protection domain; and
      calculating second destination checksums on the destination set of data chunks, using the algorithm and parameters of the protection scheme for the destination protection domain.

4. The method of claim 3, wherein the chunks in the source set of data chunks are equivalent in size to the chunks in the destination set of data chunks.

5. The method of claim 3, wherein the chunks in the source set of data chunks are smaller than the chunks in the destination set of data chunks.

6. The method of claim 3 wherein the chunks in the source set of data chunks are larger than the chunks in the destination set of data chunks.

7. The method of claim 1, wherein the algorithm of the protection scheme for the source protection domain is different from the algorithm of the protection scheme for the destination protection domain.

8. The method of claim 1, wherein said transmitting comprises transferring the source set of data chunks through one or more intermediate protection domains situated between the source protection domain and the destination protection domain.

9. The method of claim 1, further comprising:
   transmitting the first source checksums from the source protection domain to the destination protection domain.

10. The method of claim 1, further comprising:
   transmitting the second source checksums from the destination protection domain to the source protection domain.

11. The method of claim 1, further comprising:
   transmitting the first destination checksums from the destination protection domain to the source protection domain.

12. The method of claim 3, further comprising:
   transmitting the second destination checksums from the source protection domain to the destination protection domain.

13. A computer readable storage medium storing instructions that, when executed by a computer, cause the computer to perform a method of facilitating verification of the integrity of data transmitted between protection domains, the method comprising:
   in a source protection domain, obtaining first source checksums calculated on chunks in a source set of data chunks using an algorithm and parameters of a protection scheme for the source protection domain;
   transmitting the source set of data chunks from the source protection domain to a destination protection domain, wherein transmitting the algorithm and parameters involves forwarding the algorithm and parameters from the source protection domain to the destination protection domain so that the destination protection domain can verify the source protection domain's checksum;
   transmitting algorithm and parameters of the protection scheme for the source protection domain algorithm from the source protection domain to the destination protection domain;
   in the destination protection domain:
      receiving the source set of data chunks as a destination set of data chunks;
      receiving the algorithm and parameters of the protection scheme for the source protection domain;

calculating first destination checksums on the destination set of data chunks, using an algorithm and parameters of a protection scheme for the destination protection domain;

identifying, in the destination set of data chunks, the source set of data chunks; and calculating second source checksums on the source set of data chunks, using the algorithm and parameters of the protection scheme for the source protection domain.

14. A computer-implemented method of verifying data transferred between protection domains, wherein the computer includes a processor, the method comprising:

transferring a source set of data chunks (S1 ... SN) from a source protection domain to a destination protection domain in which the source set of data chunks is received as a destination set of data chunks (D1 ... DM);

transferring a destination set of data chunks (DT1 ... DTN) from a destination protection domain to a source protection domain in which the destination set of data chunks is received as a source set of data chunks (SDT1 ... SDTM);

transferring data integrity metadata (DIM S1 ... DIM SN) from the source protection domain to the destination protection domain, wherein (DIM S1 ... DIM SN) was computed on the source set of data chunks (S1 ... SN) prior to said transfer of the source set of data chunks using an algorithm and parameters of the source protection domain;

transferring data integrity metadata (DIM DT1 ... DIM DTN) from the destination protection domain to the source protection domain, wherein (DIM DT1 ... DIM DTN) was computed on the destination set of data chunks (DT1 ... DTN) prior to said transfer of the destination set of data chunks using algorithm and parameters of the destination data protection scheme;

transferring the algorithm and parameters of the source data protection scheme from the source protection domain to the destination protection domain, wherein transmitting the algorithm and parameters involves forwarding the algorithm and parameters from the source protection domain to the destination protection domain so that the destination protection domain can verify the source protection domain's checksum;

transferring the algorithm and parameters of the destination data protection scheme from the destination protection domain to the source protection domain;

in the destination protection domain, computing data integrity metadata (DIM S1' ... DIM SN') on the source set of data chunks (S1 ... SN) using the algorithm and parameters of the source data protection scheme;

in the source protection domain, computing data integrity metadata (DIM DT1' ... DIM DTN') on the destination set of data chunks (DT1 ... DTN) using the algorithm and parameters of the destination data protection scheme;

in the source protection domain, comparing the data integrity metadata (DIM S1 ... DIM SN) to the data integrity metadata (DIM S1' ... DIM SN'); and in the destination protection domain, comparing the data integrity metadata (DIM DT1 ... DIM DTN) to the data integrity metadata (DIM DT1' ... DIM DTN').

15. The method of claim 14, wherein the data integrity metadata comprise checksums.

16. The method of claim 14, wherein the data integrity metadata comprise the cyclic redundancy check.

17. The method of claim 14, wherein either of the source protection domain or the destination protection domain stores data integrity metadata computed by the other protection domain.

18. A computer readable storage medium storing instructions that, when executed by a computer, cause the computer to perform a method comprising:

transferring a source set of data chunks (S1 ... SN) from a source protection domain to a destination protection domain in which the source set of data chunks is received as a destination set of data chunks (D1 ... DM);

transferring a destination set of data chunks (DT1 ... DTN) from a destination protection domain to a source protection domain in which the destination set of data chunks is received as a source set of data chunks (SDT1 ... SDTM);

transferring data integrity metadata (DIM S1 ... DIM SN) from the source protection domain to the destination protection domain, wherein (DIM S1 ... DIM SN) was computed on the source set of data chunks (S1 ... SN) prior to said transfer of the source set of data chunks using an algorithm and parameters of a source data protection scheme;

transferring data integrity metadata (DIM DT1 ... DIM DTN) from the destination protection domain to the source protection domain, wherein (DIM DT1 ... DIM DTN) was computed on the destination set of data chunks (DT1 ... DTN) prior to said transfer of the destination set of data chunks using algorithm and parameters of the destination data protection scheme;

transferring the algorithm and parameters of the source data protection scheme from the source protection domain to the destination protection domain, wherein transmitting the algorithm and parameters involves forwarding the algorithm and parameters from the source protection domain to the destination protection domain so that the destination protection domain can verify the source protection domain's checksum;

transferring the algorithm and parameters of the destination data protection scheme from the destination protection domain to the source protection domain in the destination protection domain, computing data integrity metadata (DIM S1' ... DIM SN') on the source set of data chunks (S1 ... SN) using the algorithm and parameters of the source data protection scheme;

in the source protection domain, computing data integrity metadata (DIM DT1' ... DIM DTN') on the destination set of data chunks (DT1 ... DTN) using the algorithm and parameters of the destination data protection scheme;

in the source protection domain, comparing the data integrity metadata (DIM S1 ... DIM SN) to the data integrity metadata (DIM S1' ... DIM SN'); and in the destination protection domain, comparing the data integrity metadata (DIM DT1 ... DIM DTN) to the data integrity metadata (DIM DT 1' ... DIM DTN').

19. An apparatus for verifying the correctness of data transferred between protection domains, comprising:

a processor;

a memory;

a communication module in the source protection domain configured to transfer data from a source protection domain to a destination protection domain;

a second communication module in the destination protection domain configured to transfer data from a destination protection domain to a source protection domain;

a data integrity module in the source protection domain configured to:
  compute data integrity metadata for the data within the source protection domain;
  forward the computed data integrity metadata to the destination protection domain; and
  forward an algorithm and parameters of a source data protection scheme from the source protection domain to the destination protection domain, wherein transmitting the algorithm and parameters involves forwarding the algorithm and parameters from the source protection domain to the destination protection domain so that the destination protection domain can verify the source protection domain's checksum;
a second data integrity module in the destination protection domain configured to:
  compute data integrity metadata for the data within the destination protection domain;
  forward the computed data integrity metadata to the source protection domain; and
  forward an algorithm and parameters of a destination data protection scheme from the destination protection domain to the source protection domain;
a comparison module in the destination protection domain configured to compare the computed data integrity metadata from the source protection domain with data integrity metadata computed on the data in the destination protection domain using the algorithm and parameters of a source data protection scheme; and
a second comparison module in the source protection domain configured to compare the computed data integrity metadata from the destination protection domain with data integrity metadata computed on the data in the source protection domain using the algorithm and parameters of a source data protection scheme.

20. The apparatus of claim 19, wherein:
the data is formatted in the source protection domain as a first set of data chunks; and
the data is formatted in the destination protection domain as a second set of data chunks different from the first set of data chunks.

21. The apparatus of claim 20, wherein:
the data integrity module is configured to compute data integrity metadata on the data formatted as the first set of data chunks; and
the comparison module is configured to compare the data integrity metadata computed on the data formatted as the first set of data chunks with data integrity metadata received from the destination protection domain.

22. The apparatus of claim 20, wherein:
the data integrity module is further configured to compute data integrity metadata on the data formatted as the second set of data chunks; and
the comparison module is configured to compare the data integrity metadata computed on the data formatted as the second set of data chunks with data integrity metadata received from the destination protection domain.

23. The method of claim 3, further comprising:
comparing the first destination checksums with the second destination checksums.

24. The storage medium of claim 13, the method further comprising:
transmitting the algorithm and parameters of the protection scheme for the destination protection domain to the source protection domain; and
in the source protection domain:
  identifying, in the source set of data chunks, the destination set of data chunks;
  receiving the algorithm and parameters of the protection scheme for the destination protection domain; and
  calculating second destination checksums on the destination set of data chunks, using the algorithm and parameters of the protection scheme for the destination protection domain.

* * * * *